US00RE50206E

(19) United States
(12) Reissued Patent
Choo

(10) Patent Number: US RE50,206 E
(45) Date of Reissued Patent: Nov. 12, 2024

(54) SAFE DRIVING SUPPORT APPARATUS AND METHOD

(71) Applicant: HYUNDAI MOBIS CO., LTD., Seoul (KR)

(72) Inventor: Jae Hyun Choo, Anyang-si (KR)

(73) Assignee: HYUNDAI MOBIS CO., LTD., Seoul (KR)

(21) Appl. No.: 17/901,287

(22) Filed: Sep. 1, 2022

Related U.S. Patent Documents

Reissue of:
(64) Patent No.: 10,759,440
Issued: Sep. 1, 2020
Appl. No.: 16/203,233
Filed: Nov. 28, 2018

(30) Foreign Application Priority Data

Dec. 18, 2017 (KR) ..... 10-2017-0174623

(51) Int. Cl.
*B60W 40/09* (2012.01)
*G06V 20/59* (2022.01)

(52) U.S. Cl.
CPC ..... *G06V 20/597* (2022.01); *B60W 40/09* (2013.01); *B60W 2540/22* (2013.01)

(58) Field of Classification Search
CPC G06V 20/597; B60W 40/09; B60W 2540/22; G05D 1/0061; G05D 1/0214
See application file for complete search history.

(56) References Cited

U.S. PATENT DOCUMENTS

2011/0043635 A1* 2/2011 Fujita ..... B60W 40/09 348/149
2012/0078509 A1* 3/2012 Choi ..... G01C 21/3415 701/423
2013/0054090 A1* 2/2013 Shin ..... B60K 28/06 701/36
2014/0066256 A1* 3/2014 Yu ..... F02N 11/0822 477/204
2015/0202536 A1* 7/2015 Ortel ..... A63G 7/00 104/53

(Continued)

FOREIGN PATENT DOCUMENTS

JP 2015-231828 A 12/2015
KR 10-2013-0023535 A 3/2013

(Continued)

*Primary Examiner* — Mark Sager

(74) *Attorney, Agent, or Firm* — NSIP Law

(57) ABSTRACT

A safe driving support apparatus may include: an emotion index detection unit configured to detect an emotion index of a driver or passenger, using one or more of vision, voice and behavior of the driver or passenger; a driver risk index detection unit configured to detect a driver risk index using ego vehicle driving information and surrounding environment information of an ego vehicle; a driving difficulty level detection unit configured to detect a driving difficult level depending on a driving position of the ego vehicle; a vehicle driving unit configured to control autonomous driving of the ego vehicle; and a control unit configured to control the vehicle driving unit to drive the ego vehicle to a safe area, according to whether the emotion index, the driver risk index and the driving difficulty level are included in a preset safety area.

28 Claims, 13 Drawing Sheets

(56) References Cited

U.S. PATENT DOCUMENTS

| | | | | |
|---|---|---|---|---|
| 2015/0276415 | A1* | 10/2015 | Shrinath | G01C 21/34 701/1 |
| 2015/0329108 | A1* | 11/2015 | Kodaira | B60W 10/20 701/41 |
| 2015/0360697 | A1* | 12/2015 | Baek et al. | |
| 2016/0009295 | A1* | 1/2016 | Chun | B60Q 5/005 701/32.9 |
| 2016/0023666 | A1* | 1/2016 | Lee | A61B 5/6893 701/33.4 |
| 2017/0155867 | A1* | 6/2017 | Yokota | B60K 35/00 |
| 2017/0303842 | A1* | 10/2017 | Yoshida | A61B 5/18 |
| 2018/0093625 | A1* | 4/2018 | Shintani | G06K 9/0061 |
| 2018/0274934 | A1* | 9/2018 | Agrawal | B60S 13/00 |

FOREIGN PATENT DOCUMENTS

| | | | |
|---|---|---|---|
| KR | 10-2015-0044134 | A | 4/2015 |
| KR | 10-1555444 | B1 | 10/2015 |
| KR | 10-2017-0018696 | A | 2/2017 |
| KR | 10-2017-0109758 | A | 10/2017 |
| WO | WO 2009/107210 | A1 | 9/2009 |
| WO | WO 2016/047063 | A1 | 3/2016 |

* cited by examiner

SAFE DRIVING SUPPORT APPARATUS AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCES TO RELATED APPLICATIONS

*This* application *is a Reissue of U.S. patent application Ser. No. 16/203,233, filed Nov. 28, 2018, now U.S. Pat. No. 10,759,440, which* claims priority to Korean *Patent Application No.* 10-2017-0174623, filed on Dec. 18, 2017, which is incorporated by reference in its entirety.

BACKGROUND OF THE INVENTION

The present invention relates to a safe driving support apparatus and method, and more particularly, to a safe driving support apparatus and method capable of supporting a driver's safe driving.

There are various factors that aggravate stress to cause a road rage and/or stress-related accident, the various factors including an increase in number of vehicles on the road, a limited road capacity, and a stressor related to modern life.

However, the conventional approaches to road safety do not satisfactorily reduce such types of accidents.

Recently, the autonomous driving control system has disclosed a technique capable of an autonomous vehicle by reflecting a driver's emotion characteristic. However, since the autonomous driving control system does not fully consider a driving condition or external condition, the autonomous driving control system may be inadequate to induce safe driving.

The related art of the present invention is disclosed in Korean Patent Publication No. 10-2017-0109758 published on Oct. 10, 2017, and entitled "Voice interface device for vehicle".

SUMMARY OF THE INVENTION

Embodiments of the present invention are directed to a safe driving support apparatus and method which can determine the safety of a vehicle in operation by considering an emotion index of a driver or passenger, a driver risk index and a driver difficulty altogether, and move the vehicle to a safe area through steering and braking control of the vehicle according to the determination result, thereby preventing an accident.

In one embodiment, a safe driving support apparatus may include: an emotion index detection unit configured to detect an emotion index of a driver or passenger, using one or more of vision, voice and behavior of the driver or passenger; a driver risk index detection unit configured to detect a driver risk index using ego vehicle driving information and surrounding environment information of an ego vehicle; a driving difficulty level detection unit configured to detect a driving difficult level depending on a driving position of the ego vehicle; a vehicle driving unit configured to control autonomous driving of the ego vehicle; and a control unit configured to control the vehicle driving unit to drive the ego vehicle to a safe area, according to whether the emotion index, the driver risk index and the driving difficulty level are included in a preset safety area.

The emotion index detection unit may include: a first emotion recognizer configured to detect a characteristic value of a voice signal of the driver or the passenger, and detect a voice index according to the detected characteristic value; a second emotion recognizer configured to take an image of the driver or the passenger, and detect a vision index of the driver or the passenger by analyzing the taken image; a third emotion recognizer configured to sense a position of an accelerator or brake, and detect a behavior index according to the start pattern of the accelerator or brake and a motion of the passenger; and an emotion index calculator configured to calculate the emotion index using the voice index, the vision index and the behavior index.

The first emotion recognizer may include: a voice signal sensing unit configured to recognize the voice signal of the driver or the passenger; and a voice index detection unit configured to detect the characteristic value of the voice signal detected by the voice signal sensor, and detect the voice index corresponding to the detected characteristic value.

The second emotion recognizer may include: a driver face filming unit configured to film the eyes or face of the driver; a passenger face filming unit configured to film the eyes or face of the passenger; and a vision index detection unit configured to detect the eyes and face of the driver in an image taken by the driver face filming unit, detect the eyes and face of the passenger in an image taken by the passenger face filming unit, and detect the vision index according to the eye movement or facial expression of the driver or the passenger.

The third emotion recognizer may include: a start pattern sensing unit configured to sense the start pattern of the accelerator or the brake; a passenger motion index detection unit configured to detect a passenger motion index using one or more of an arm motion size and motion radius of the passenger and a motion frequency of the passenger; and a behavior index detection unit configured to detect the behavior index of the driver or the passenger, using a start index corresponding to the sensed start pattern of the accelerator or the brake or the passenger motion index detected by the passenger motion index detection unit.

The safe driving support apparatus may further include an emotional state control unit configured to control the emotional states of the driver and the passenger to settle down.

The control unit may apply the voice index, the vision index and the behavior index to a learning-based emotion map, and control the emotional state control unit when the emotion index is not included in a preset stable area.

The learning-based emotion map may divide the emotional state of the driver into the stable area and a risk area, depending on the voice index, the vision index and the behavior index.

The driver risk index detection unit may include: an ego vehicle driving trajectory generator configured to generate an ego vehicle driving trajectory using the ego vehicle driving information received from an internal sensor for sensing a driving situation of the ego vehicle; a neighboring vehicle trajectory generator configured to generate a neighboring vehicle trajectory using the surrounding environment information received from an external sensor for sensing the surrounding situation of the vehicle; a trajectory load calculator configured to calculate a trajectory load indicating a comparison result between a preset threshold value and a trajectory distance corresponding to a difference between the neighboring vehicle trajectory and the ego vehicle driving trajectory; and a risk index manager configured to generate a driver risk index corresponding to the calculated trajectory load.

The driving difficulty level detection unit may define and quantify driving difficulty levels for various areas, and detect the driving difficulty level according to the current position of the ego vehicle.

When the emotion index, the driver risk index and the driving difficulty level are not included in the safety area, the control unit may control the vehicle driving unit to drive the ego vehicle to a safe area.

In another embodiment, a safe driving support method may include: detecting, by an emotion index detection unit, an emotion index of a driver or passenger, using one or more of vision, voice and behavior of the driver or the passenger; detecting, by a driver risk index detection unit, a driver risk index using ego vehicle driving information and surrounding environment information of an ego vehicle; detecting, by a driving difficulty level detection unit, a driving difficulty level depending on a driving position of the ego vehicle; and determining, by a control unit, whether the emotion index, the driver risk index and the driving level difficulty are included in a preset safety area, and controlling a vehicle driving unit to drive the ego vehicle to a safe area, according to the determination result.

The detecting of the emotion index may include detecting a characteristic value of a voice signal of the driver or passenger, detecting a voice index according to the detected characteristic value, taking an image of the driver or passenger, detecting a vision index of the driver or passenger by analyzing the taken image, sensing the position of an accelerator or brake, detecting a behavior index according to the start pattern of the accelerator or brake or a motion of the passenger, and calculating the emotion index using the voice index, the vision index and the behavior index.

The control unit may control the emotional state control unit to control the emotional states of the driver and the passenger to settle down, depending on whether the emotion index is included in a preset stable area.

The detecting of the driver risk index may include: generating an ego vehicle driving trajectory using the ego vehicle driving information received from an internal sensor for sensing a driving situation of the ego vehicle; generating a neighboring vehicle trajectory using the surrounding environment information received from an external sensor for sensing the surrounding situation of the vehicle; calculating a trajectory load indicating a comparison result between a preset threshold value and a trajectory distance corresponding to a difference between the neighboring vehicle trajectory and the ego vehicle driving trajectory; and generating the driver risk index corresponding to the calculated trajectory load.

The detecting of the driving difficult level may include defining and quantifying driving difficulty levels for various areas, and detecting the driving difficulty level according to the current position of the ego vehicle.

The controlling of the vehicle driving unit to drive the ego vehicle to the safe area may include applying the voice index, the vision index and the behavior index to a learning-based emotion map, and determining whether the emotion index is not included in a preset stable area.

The learning-based emotion map may divide the emotional state of the driver into the stable area and a risk area, depending on the voice index, the vision index and the behavior index.

DESCRIPTION OF SPECIFIC EMBODIMENTS

Hereafter, a safe driving support apparatus and method in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
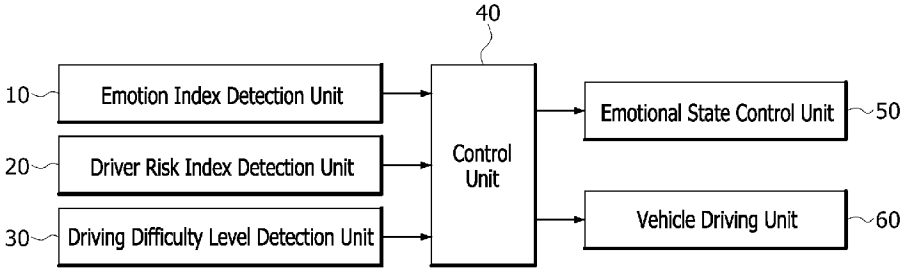
FIG. 1 is a block diagram illustrating a safe driving support apparatus in accordance with an embodiment of the present invention.
Figure 2:
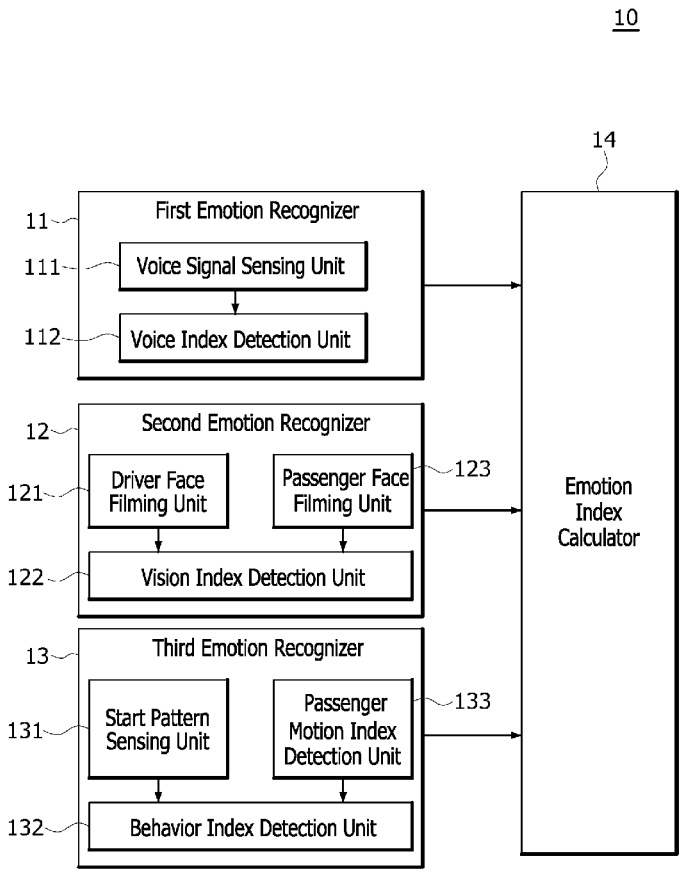
FIG. 2 is a block diagram illustrating an emotion index detection unit in accordance with the embodiment of the present invention.
Figure 3:
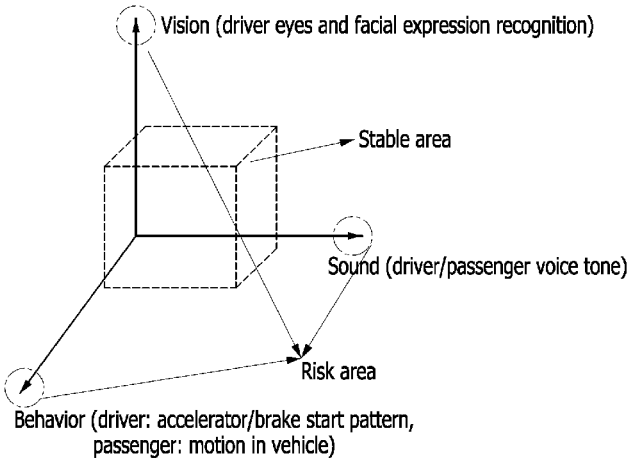
FIG. 3 is an emotion map illustrating a stable area of an emotion index in accordance with the embodiment of the present invention.
Figure 4:
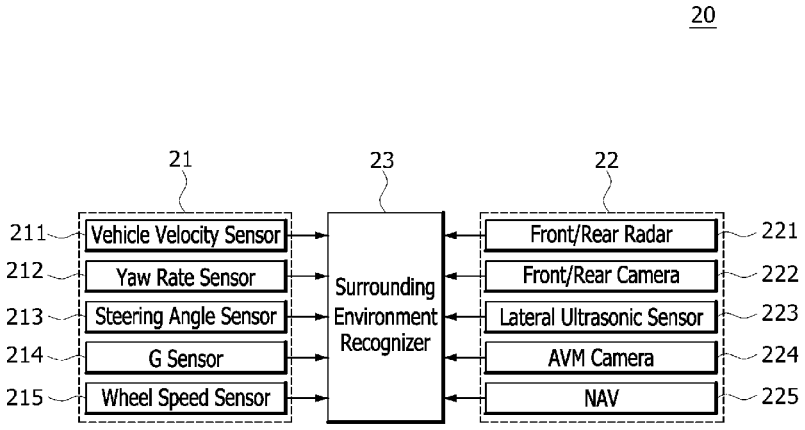
FIG. 4 is a block diagram illustrating a driver risk index detection unit in accordance with the embodiment of the present invention.
Figure 5:
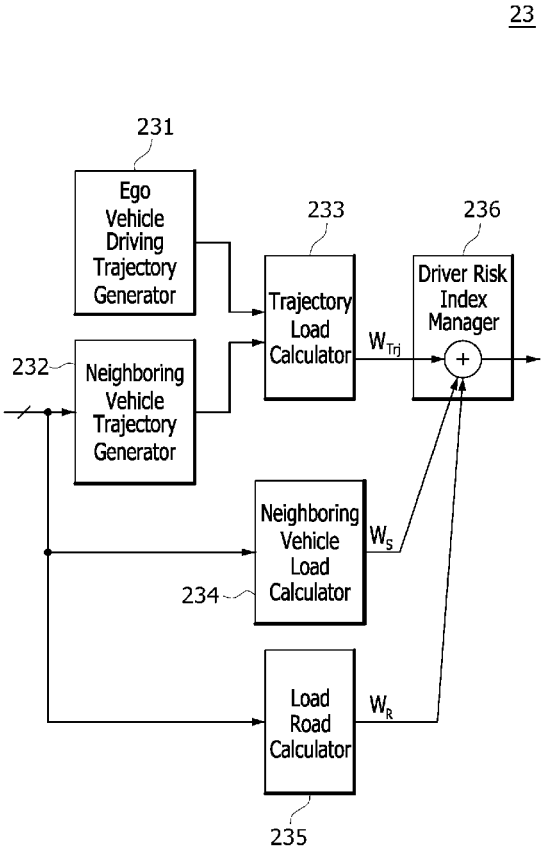
FIG. 5 is a block diagram illustrating a surrounding environment recognizer of FIG. 4.
Figure 6:
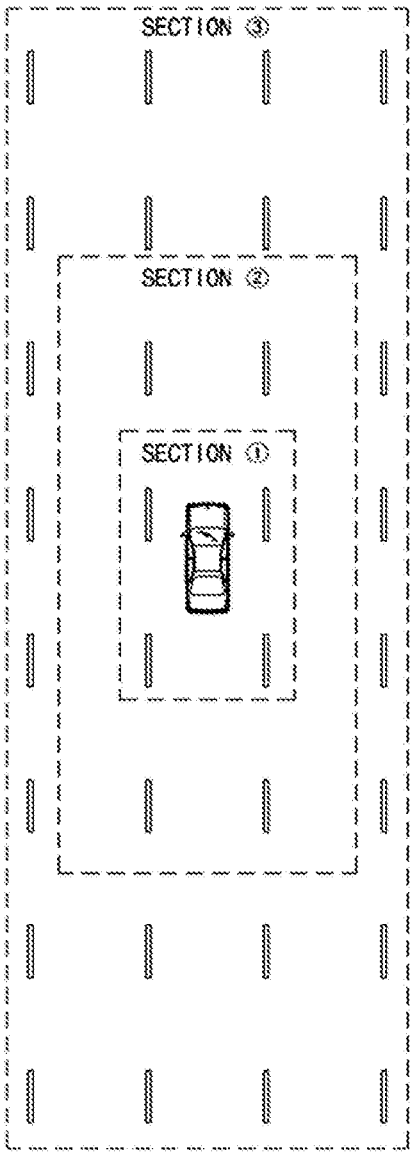
FIG. 6 schematically illustrates three kinds of critical sections which are divided by a neighboring vehicle load calculator of FIG. 5 based on a time to collision (TTC).
Figure 7:
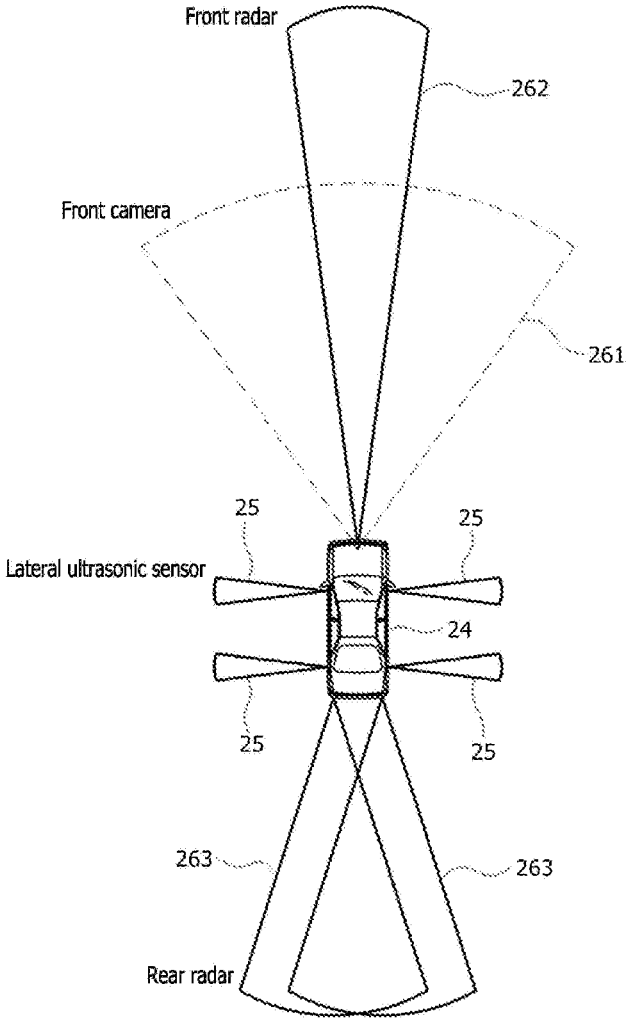
FIG. 7 illustrates a sensor configuration for detecting neighboring vehicles in the respective critical sections of FIG. 6.
Figure 8:
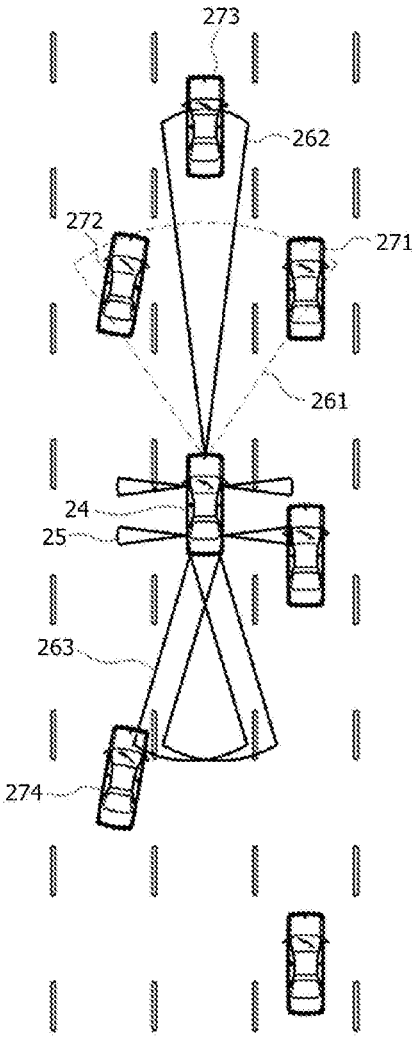
FIG. 8 illustrates that neighboring vehicles are detected through the sensor configuration of FIG. 7.
Figure 9:
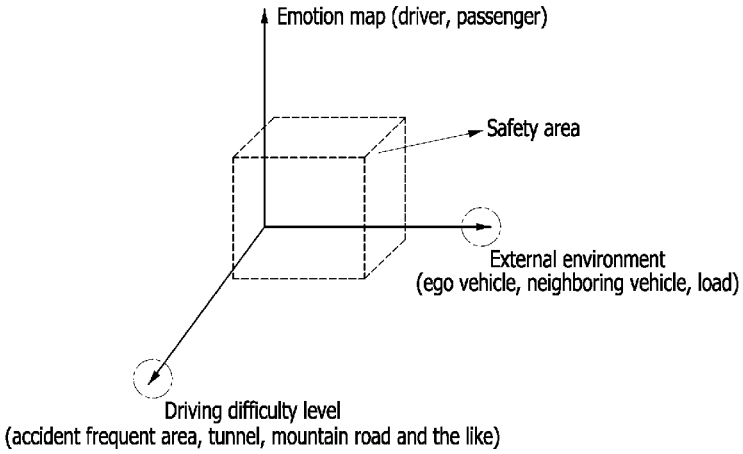
FIG. 9 is an emotion map illustrating a safety area for an emotion index, a driver risk index and a driving difficulty level in accordance with the embodiment of the present invention.
Figure 10:
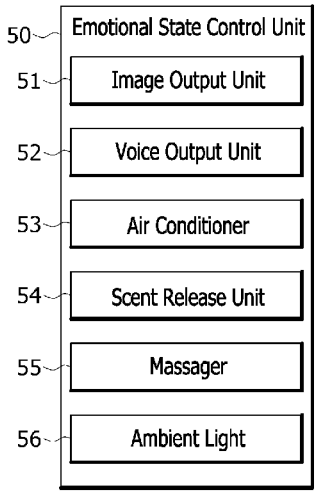
FIG. 10 is a block diagram illustrating an emotional state control unit in accordance with the embodiment of the present invention.
Figure 11:
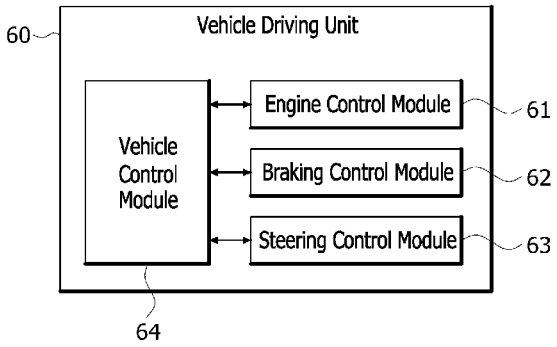
FIG. 11 is a block diagram illustrating a vehicle driving unit in accordance with the embodiment of the present invention.

FIG. 1 is a block diagram illustrating a safe driving support apparatus in accordance with an embodiment of the present invention, FIG. 2 is a block diagram illustrating an emotion index detection unit in accordance with the embodiment of the present invention, FIG. 3 is an emotion map illustrating a stable area of an emotion index in accordance with the embodiment of the present invention, FIG. 4 is a block diagram illustrating a driver risk index detection unit in accordance with the embodiment of the present invention, FIG. 5 is a block diagram illustrating a surrounding environment recognizer of FIG. 4, FIG. 6 schematically illustrates three kinds of critical sections which are divided by a neighboring vehicle load calculator of FIG. 5 based on a time to collision (TTC), FIG. 7 illustrates a sensor configuration for detecting neighboring vehicles in the respective critical sections of FIG. 6, FIG. 8 illustrates that neighboring vehicles are detected through the sensor configuration of FIG. 7, FIG. 9 is an emotion map illustrating a safety area for an emotion index, a driver risk index and a driving difficulty level in accordance with the embodiment of the present invention, FIG. 10 is a block diagram illustrating an emotional state control unit in accordance with the embodiment of the present invention, and FIG. 11 is a block diagram illustrating a vehicle driving unit in accordance with the embodiment of the present invention.

Referring to FIG. 1, the safe driving support apparatus in accordance with the embodiment of the present invention may include an emotion index detection unit 10, a driver risk index detection unit 20, a driving difficulty level detection unit 30, a control unit 40, an emotional state control unit 50 and a vehicle driving unit 60.

The emotion index detection unit 10 may detect an emotion index of a driver or passenger, using one or more of vision, voice and behavior of the driver or passenger.

Referring to FIG. 2, the emotion index detection unit 10 may include a first emotion recognizer 11, a second emotion recognizer 12, a third emotion recognizer 13 and an emotion index calculator 14.

The first emotion recognizer 11 may serve to detect a voice index indicating the emotional state of the driver or passenger using a voice signal of the driver or passenger. The first emotion recognizer 11 may detect the characteristic value of a voice signal of the driver or passenger, and detect the voice index according to the detected characteristic value.

The voice index may be obtained by quantifying an emotional state of the driver or passenger, which is detected based on voice. The voice index may be set to each of the characteristic values of speech sounds of the driver and the passenger.

The first emotion recognizer 11 may include a voice signal sensing unit 111 and a voice index detection unit 112.

The voice signal sensing unit 111 may sense a voice signal of the driver or passenger, and convert the speech sound of the driver or passenger into an electrical voice signal.

The voice signal sensing unit 111 may include a microphone or the like.

The voice index detection unit 112 may detect a characteristic value, for example, the tone or pitch of the driver or passenger by processing the voice signal sensed by the voice signal sensing unit 111, and detect a voice index corresponding to the detected tone or pitch of the driver or passenger.

The second emotion recognizer 12 may take an image of the eyes or face of the driver or passenger, and detect a vision index of the driver or passenger by analyzing the taken image.

The vision index may be obtained by quantifying an emotional state of the driver or passenger, which is detected based on vision, and set to the eyes or facial expression of the driver or passenger.

The second emotion recognizer 12 may include a driver face filming unit 121, a passenger face filming unit 123 and a vision index detection unit 122.

The driver face filming unit 121 may film the eyes or face of the driver. The installation position of the driver face filming unit 121 is not specifically limited, but set to various positions of the ego vehicle, as long as the driver face filming unit 121 can film the eyes or face of the driver.

The passenger face filming unit 123 may film the eyes or face of the passenger. The installation position of the passenger face filming unit 123 is not specifically limited, but set to various positions of the ego vehicle, as long as the driver face filming unit 121 can film the eyes or face of the passenger.

The vision index detection unit 122 may detect the eyes and faces of the driver and the passenger in images taken by the driver face filming unit 121 and the passenger face filming unit 123, and detect vision indexes according to the facial expressions or the eye movements of the driver and the passenger.

The vision index detection unit 122 may detect a vision index corresponding to the eyes or facial expression of the driver or the passenger in a state of excitement. Specifically, the vision index detection unit 122 may track the movement or direction of the eyes or detect a change of the facial expression, and detect a vision index of the driver or the passenger, corresponding to the movement or direction of the eyes or the change of the facial expression.

The third emotion recognizer 13 may detect a behavior index based on the emotional state of the driver or passenger.

The behavior index may be obtained by quantifying the emotional state of the driver or passenger, which is detected based on behavior. The behavior index may be set to a motion of the passenger or a start pattern when the driver steps on the accelerator pedal or the brake pedal.

The third emotion recognizer 13 may include a start pattern detection unit 131, a passenger motion index detection unit 133 and a behavior index detection unit 132.

The start pattern detection unit 131 may detect the start pattern of the accelerator or the brake through the position of the accelerator or the brake.

The passenger motion index detection unit 133 may detect a passenger motion index based on the motion of the passenger. Specifically, the passenger motion index detection unit 133 may take an image of the passenger, and detect a passenger motion index using the motion of the passenger in the taken image, for example, one or more of the arm motion size and motion radius of the passenger and the motion frequency of the passenger. At this time, the motion of the passenger can be filmed through a separate camera for filming the passenger in the vehicle.

That is, the passenger motion index detection unit 133 may store a passenger motion index corresponding to the motion of the passenger in advance, detect any one of the arm motion size and motion radius of the passenger and the motion frequency of the passenger in the taken image, and then detect a passenger motion index corresponding to the detected motion.

The behavior index detection unit 132 may detect behavior indexes of the driver and the passenger, using the start index corresponding to the start pattern of the accelerator or the brake, sensed by the start pattern detection unit 131 and the passenger motion index detected by the passenger motion index detection unit 133.

At this time, a value obtained by using any one or both of the start index and the passenger motion index may be adopted as the behavior index.

For example, when the behavior index is any one of the start index and the passenger motion index, the index having a larger value between them may be adopted as the behavior index.

Furthermore, when both of the start index and the passenger motion index are used, the average value of the start index and the passenger motion index may be set to the behavior index, or weights may be applied to the start index and the passenger motion index, respectively, in order to calculate the behavior index.

The emotion index calculator 14 may calculate an emotion index by applying the voice index, the vision index and the behavior index to a learning-based emotion map.

The learning-based emotion map, which is a 3D emotion map using the voice index, the vision index and the behavior index, may be used to determine whether the emotional state of the driver belongs to a stable area or critical area, according to the voice index, the vision index and the behavior index. That is, the learning-based emotion map may divide the emotional state of the driver into the stable area and the critical area, according to the voice index, the vision index and the behavior index.

As illustrated in FIG. 3, the emotion index calculator 14 may detect the emotion index using the voice index, the vision index and the behavior index.

When the emotion index is not included in the preset stable area after the voice index, the vision index and the behavior index have been applied to the learning-based emotion map, the emotional state control unit 50 may be operated to keep the emotional state of the driver in balance. This process will be described later.

The driver risk index detection unit 20 may analyze the driving tendency of the driver, and calculate a driver risk index (or surrounding risk index) corresponding to the driving tendency. The calculated result may be provided as various types of information to the driver, in order to inform the driver of a dangerous situation.

The driver risk index detection unit 20 may sense the current driving situation of the ego vehicle and driving situations of vehicles around the ego vehicle through various sensors of the vehicle in real time, and determine the dangerous situation of the vehicle by reflecting the sensed result.

Referring to FIG. 4, the driver risk index detection unit 20 may include an internal sensor 21, an external sensor 22 and a surrounding environment recognizer 23.

The internal sensor 21 may sense the driving situation of the ego vehicle 24, and generate ego vehicle driving information. The ego vehicle driving information may include vehicle velocity information, yaw rate information, steering angle information, acceleration information and wheel speed information.

Therefore, the internal sensor 21 may include a vehicle velocity sensor 211 for acquiring the vehicle velocity information, a yaw rate sensor 212 for acquiring the yaw rate information, a steering angle sensor 213 for acquiring the steering angle information, a G sensor 214 for sensing the acceleration and direction of the vehicle, and a wheel speed sensor 215 for acquiring the wheel speed information.

The external sensor 22 may sense the surroundings of the ego vehicle 24, and generate surrounding environment information. The surrounding environment information may include front/rear radar information, front/rear image information, lateral ultrasonic wave information, AVM (Around View Monitoring) image information and navigation information.

Therefore, the external sensor 22 may include a front/rear radar 221 for acquiring the front/rear radar information, a front/rear camera 222 for acquiring the front/rear image information, a lateral ultrasonic sensor 223 for acquiring the lateral ultrasonic information, an AVM camera 224 for acquiring the AVM image information, and a navigation system 225 for acquiring the navigation information.

The surrounding environment recognizer 23 may calculate a trajectory load using the ego vehicle driving information provided from the internal sensor 21 and the surrounding environment information provided from the external sensor 22, and manage the driver risk index (or surrounding risk index) through the calculated trajectory load. This process will be described below in detail with reference to FIG. 5.

Referring to FIG. 5, the surrounding environment recognizer 23 may calculate a trajectory load using the ego vehicle driving information provided from the internal sensor 21 and the surrounding environment information provided from the external sensor 22, and manage the driver risk index (or surrounding risk index) through the calculated trajectory load. In order to manage the driver risk index more accurately, the surrounding environment recognizer 23 may manage the driver risk index by further considering a neighboring vehicle load and a road load as well as the trajectory load. Therefore, the system for managing the driver risk index can be designed in various manners, depending on when only the trajectory load is considered in consideration of a trade-off relation between the system load and the driver risk index, when only the trajectory load and the neighboring vehicle load are considered, and when only the trajectory load and the road load are considered.

FIG. 5 illustrates that the surrounding environment recognizer 23 manages the driver risk index by considering all of the trajectory load, the neighboring vehicle load and the road load. However, the present invention is not limited thereto.

The surrounding environment recognizer 23 may include an ego vehicle driving trajectory generator 231, a neighboring vehicle trajectory generator 232, a trajectory load calculator 233, a neighboring vehicle load calculator 234, a road load calculator 235 and a driver risk index manager 236.

The ego vehicle driving trajectory generator 231 may estimate (acquire or generate) an ego vehicle driving trajectory, using the vehicle velocity information, the steering angle information, the acceleration/deceleration information and the yaw rate information, which are included in the ego vehicle driving information provided from the internal sensor 21. Additionally, the ego vehicle driving trajectory generator 231 may correct the estimated ego vehicle driving trajectory through navigation information included in the surrounding environment information provided from the external sensor 22, for example, driving road information.

The neighboring vehicle trajectory generator 232 may estimate (acquire or generate) a neighboring vehicle driving trajectory using the front/rear radar information, the image information and the lateral ultrasonic information which are included in the surrounding environment information provided from the external sensor 22.

The front/rear radar 221 for acquiring the front/rear radar information may acquire accurate distance information (longitudinal direction), while having slightly low object identification accuracy.

However, since the cameras 222 and 224 for acquiring the image information acquire single-eye images, the cameras 222 and 224 can acquire high object identification accuracy and accurate lateral direction information, while the accuracy of the distance information (longitudinal direction) is degraded.

Therefore, in order to obtain the neighboring vehicle trajectory, longitudinal distance information in a target vehicle model equation may be acquired through the front/rear radar 221, and lateral distance information in the target vehicle model equation may be acquired through the front/rear camera 222, the AVM camera 224 and the lateral ultrasonic sensor 223.

Equation 1 below indicates a vehicle model equation which is used by the neighboring vehicle trajectory generator 232 to estimate the neighboring vehicle trajectory.

$$A = \begin{bmatrix} 1 & \Delta t & 0 & 0 \\ 0 & 1 & 0 & 0 \\ 0 & 0 & 1 & \Delta t \\ 0 & 0 & 0 & 1 \end{bmatrix}, H = \begin{bmatrix} 1 & 0 & 0 & 0 \\ 0 & 0 & 1 & 0 \end{bmatrix} \quad \text{[Equation 1]}$$

$$x = \begin{bmatrix} x \\ v_x \\ y \\ v_y \end{bmatrix} \quad \boxed{\begin{aligned} x_k &= Ax_k + w_k \\ z_k &= Hx_k + v_k \end{aligned}}$$

In Equation 1, x, $V_x$, y and $V_y$ may represent state variables of target vehicles, and x and y may represent the positions of the target vehicles, which are measured by the image camera. Furthermore, $V_x$ and $V_y$ may represent the velocities of the target vehicles. Furthermore, A may represent the vehicle model equation, H may represent a measurement value model equation, and the state variables may include a distance and velocity in the x-axis direction and a distance and velocity in the y-axis direction. Suppose that system noise and measurement noise are white Gaussian noise.

The trajectory load calculator 233 may calculate a trajectory load $W_{Trj}$, indicating a comparison result between a preset threshold value and a trajectory distance corresponding to a difference between the neighboring vehicle trajectory and the ego vehicle trajectory.

When the estimation result of the ego vehicle driving trajectory and the neighboring vehicle trajectory indicates that there is a collision risk, the driver needs to pay much attention. Thus, the collision risk may be calculated as the trajectory load $W_{Trj}$.

Therefore, the trajectory load $W_{Trj}$ may be calculated as expressed by Equation 2 below, based on the ego vehicle trajectory 13-1 and the neighboring vehicle trajectory 13-3.

$$W_{Trj}(i)=|T_{Trj}(i)-D_{Trj}(i)| \text{ if } W_{Trj}(i)>\text{Threshold},0 \; W_{Trj}(i)<\text{Threshold},1 \quad \text{[Equation 2]}$$

In Equation 2, $D_{Trj}$ represents the ego vehicle trajectory, and $T_{Trj}$ represents the neighboring vehicle trajectory. Furthermore, i represents a detected neighboring vehicle, where i is 1, 2, . . . , n.

According to Equation 1, the trajectory load $W_{Trj}$ may be set to 1 when comparison results between the trajectories of the detected neighboring vehicles and the trajectory of the ego vehicle indicate that trajectory distances are smaller than a threshold value, and set to 0 when the comparison results indicate that the trajectory distances are higher than the threshold value.

The neighboring vehicle load calculator 234 may determine the number of vehicles at the front/rear/sides thereof and information on whether lane changes occur, from the surrounding environment information, and calculate a neighboring vehicle load $W_S$ through the number of vehicles and the information on whether lane changes occur. When vehicles are present around the ego vehicle in operation and the trajectories of the vehicles are significantly changed, this may act as a load to which the driver needs to pay attention.

The neighboring vehicle load calculation performed by the neighboring vehicle load calculator 234 may be divided into three critical sections ①, ② and ③ around the ego vehicle 24 based on a time to collision (TTC), as illustrated in FIG. 6. Here, the TTC may be defined as a time consumed until the corresponding vehicle collides with the target vehicle when the closing speed of the corresponding vehicle is constant. The TTC may be calculated through the vehicle velocity information and the steering angle information which are acquired from the vehicle velocity sensor 211 and the steering angle sensor 213 of the internal sensor 21.

For example, as illustrated in FIGS. 7 and 8, the neighboring vehicle load calculator 234 may recognize vehicles 271, 272, 273 and 274 around the ego vehicle 24, which are detected in detection areas 262 and 263 by the front/rear radar 221, a detection area 261 by the front/rear camera 222, and a detection area 25 by the lateral ultrasonic sensor 223, and calculate TTC values by dividing relative distances from the detected vehicles by relative velocity values, in order to acquire the critical sections ①, ② and ③.

When the three critical sections ①, ② and ③ are acquired, the neighboring vehicle load calculator 234 may calculate the neighboring vehicle load $W_S$ by determining the numbers of vehicles detected in the respective sections and the information on whether lane changes occur.

The higher the number of vehicles detected in the section ① and the number of lane changes, the higher the calculated neighboring vehicle load $W_S$.

On the other hand, when there are almost no detected vehicles around the ego vehicle or a vehicle is detected in the section ③ and the trajectory of the neighboring vehicle is not significantly changed, the neighboring vehicle load $W_S$ may decrease.

The neighboring vehicle load $W_S$ may be expressed as Equation 3 below.

$$W_S = \alpha \sum_{i=1}^{n} S_i + \beta \sum_{i=1}^{n} L_i \quad \text{[Equation 3]}$$

In Equation 3, α and β represent weighting factors, S represents the positions of the detected vehicles (the sections ①, ② and ③, and L represents whether the detected neighboring vehicles change the lane. At this time, L may be set to 1 when the corresponding neighboring vehicle changes the lane, or set to 0 when the corresponding neighboring vehicle does not change the lane. The detected vehicles may be represented by 1 to n.

The road load calculator 235 may calculate a road load using a road shape, a road surface condition and a traffic condition which are included in the surrounding environment information. Since the driver should pay more attention to a curved road than a straight road, pay more attention to an intersection than a general road, and pay more attention when the traffic condition ahead is bad, the road load needs to be calculated.

The road load calculator 235 may recognize the shape of the road ahead of the ego vehicle, using the navigation information acquired from the navigation system 225 of the vehicle, and reflect the road surface condition information acquired from the front/rear camera (paved road or unpaved road). The calculation may be expressed as Equation 4 below.

$$W_R=\alpha\times A+\beta\times B+\gamma\times C \quad \text{[Equation 4]}$$

In Equation 4, A represents the road condition. For example, A may have a larger value as the curvature of the road ahead is higher. In addition, A may have a larger value in case of a traffic sign change, pedestrian, speed limit or children protection zone. Furthermore, B represents the road surface condition value reflecting a paved road or unpaved road, and C represents the traffic of the road ahead, and has a larger value as the traffic is higher. A, B and C may be normalized in the range of 0 to 5.

The driver risk index manager 236 may provide the driver with the driver risk index (around risk index) in which the loads $W_{Trj}$, $W_S$ and $W_R$ calculated at the respective steps are integrated. For example, the driver risk index manager 236 may add up the trajectory load $W_{Trj}$, the neighboring vehicle load $W_S$ and the road load $W_R$, and provide the addition result as the driver risk index.

The driver risk index may be expressed as Equation 5 below.

$$\text{Driver risk index}=W_{Trj}+W_S+W_R \quad \text{[Equation 5]}$$

The driving difficulty level detection unit 30 may detect a driving difficulty level depending on the driving position of the ego vehicle 24. That is, the driving difficulty level detection unit 30 may define and quantify driving difficulty levels for various areas in advance, check in which the current position of the ego vehicle 24 is included among the above-described areas, and then detect a driving difficulty level corresponding to the current position of the vehicle 24.

When the current position of the ego vehicle 24 is included in an area where an accident frequently occurs or an area such as a tunnel or mountain road where driving is difficult or an actual accident occurs, the driving difficulty level may be set to a relatively high level.

The control unit 40 may control the vehicle driving unit 60 to drive the ego vehicle 24 to a safe area, depending on whether the emotion index, the driver risk index and the driving difficulty level are included in the preset safety area.

That is, as illustrated in FIG. 9, the control unit 40 may analyze the emotion index, the driver risk index and the driving difficulty level, and determine whether the emotion index, the driver risk index and the driving difficulty level are included in the preset safety area. When the determination result indicates that the emotion index, the driver risk index and the driving difficulty level are not included in the safety area, the control unit 40 may control the vehicle driving unit 60 to drive the ego vehicle to a safe area. Furthermore, the control unit 40 may warn the driver that the emotion index, the driver risk index and the driving difficulty level are not included in the safety area, or transmit a risk warning to a preset phone number, for example, the phone number of a friend of the driver or passenger.

When the emotion index is not included in the preset safety area after the voice index, the vision index and the behavior index have been applied to the learning-based emotion map, the control unit 40 may control the emotional state control unit 50 to keep the emotional state of the driver or passenger in balance.

The emotional state control unit 50 may control the emotional state of the driver or passenger, such that the emotional state of the driver or passenger settles down.

Referring to FIG. 10, the emotional state control unit 50 may include an image output unit 51, a voice output unit 52, an air conditioner 53, a scent release unit 54, a massager 55 and an ambient light 56.

For reference, the emotional state control unit 50 is not limited to the above-described embodiment, but may include various devices capable of controlling the emotion of the driver.

The vehicle driving unit 60 may drive the vehicle to a safe area through the autonomous navigation method.

Referring to FIG. 11, the vehicle driving unit 60 may include an engine control module 61 for controlling the engine of the ego vehicle 24, a braking control module 62 for controlling the braking of the ego vehicle 24, a steering control module 63 for controlling the steering of the ego vehicle 24, and a vehicle control module 64 for controlling the braking control module 62 and the steering control module 63 to move the vehicle to a safe area.

Hereafter, a safe driving support method in accordance with an embodiment of the present invention will be described in detail with reference to FIGS. 12 and 13.

Figure 12:
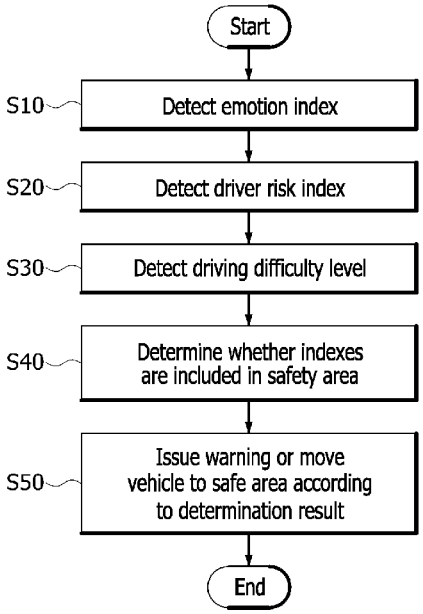
FIG. 12 is a flowchart illustrating a safe driving support method in accordance with an embodiment of the present invention.
Figure 13:
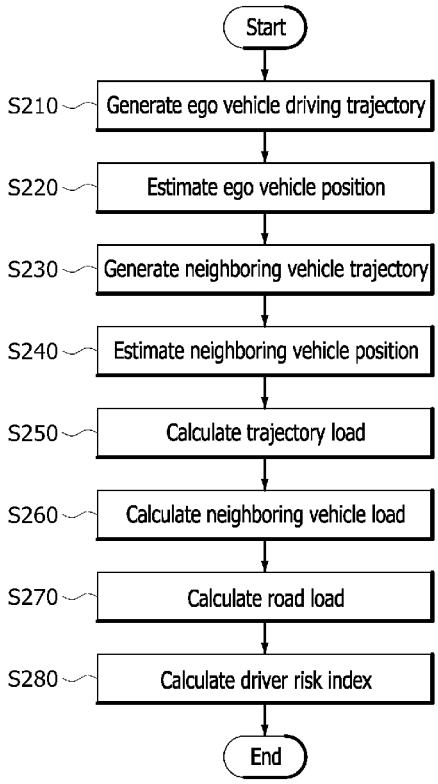
FIG. 13 is a flowchart illustrating a driver risk index detection process in accordance with the embodiment of the present invention.

FIG. 12 is a flowchart illustrating a safe driving support method in accordance with an embodiment of the present invention, and FIG. 13 is a flowchart illustrating a driver risk index detection process in accordance with the embodiment of the present invention.

Referring to FIG. 12, the emotion index detection unit 10 may detect an emotion index of a driver or passenger, using one or more of vision, voice and behavior of the driver or passenger, at step S10.

In this case, the first emotion recognizer 11 may detect the characteristic value of a voice signal of the driver or passenger, and detect a voice index according to the detected characteristic value. The second emotion recognizer 12 may take an image of the eyes or face of the driver or passenger, detect the eyes and face of the driver or passenger in the taken image, and detect a vision index according to the detected eye movement or facial expression of the driver or passenger. The third emotion recognizer 13 may sense the position of the accelerator or the brake, detect a start pattern based on a position change of the accelerator or the brake, detect a start index corresponding to the start pattern, detect a passenger motion index through the passenger motion index detection unit 133, and detect a behavior index of the driver or passenger using the detected start index or the passenger motion index.

As the voice index, the vision index and the behavior index are detected by the first to third emotion recognizers 11 to 13, the emotion index calculator 14 may calculate the emotion index by applying the voice index, the vision index and the behavior index to the learning-based emotion map.

The driver risk index detection unit 20 may analyze the driving tendency of the driver, and calculate a driver risk index (or surrounding risk index) corresponding to the driving tendency, at step S20.

Referring to FIG. 13, the surrounding environment recognizer 23 may generate a driving trajectory of the ego vehicle 24 at step S210, and estimate the position of the ego vehicle 24 through the generated ego vehicle driving trajectory at step S220. The ego vehicle driving trajectory may be generated based on the vehicle velocity information, the steering angle information, the acceleration/deceleration information and the yaw rate information.

Then, the surrounding environment recognizer 23 may generate neighboring vehicle trajectories at step S230, and estimate the positions of neighboring vehicles at step S240. The neighboring vehicle trajectories may be generated based on longitudinal distance information acquired through the radar 221 and lateral distance information acquired through the camera and the lateral ultrasonic sensor. The longitudinal distance information may indicate the longitudinal distance information of a neighboring vehicle with respect to the ego vehicle 24, and the lateral distance information may indicate the lateral distance information of a neighboring vehicle with respect to the ego vehicle 24.

The surrounding environment recognizer 23 may calculate a trajectory load at step S250. The trajectory load may be calculated through the ego vehicle driving trajectory and the neighboring vehicle driving trajectories. For example, the trajectory load may be set to 1 when the comparison results between the ego vehicle driving trajectory and the traveling trajectories of the detected neighboring vehicles indicate that trajectory distances corresponding to differences therebetween are lower than the threshold value, and set to 0 when the comparison results indicate that the trajectory distances are higher than the threshold value.

When the trajectory load is calculated, the surrounding environment recognizer 23 may calculate the neighboring vehicle load at step S260. The neighboring vehicle load may be calculated in consideration of the information on whether lane changes occur and the numbers of vehicles in a plurality of critical areas which are divided around the ego vehicle 24, based on the TTC values. At this time, the surrounding environment recognizer 23 may recognize the neighboring vehicles using ultrasonic waves, and calculate the TTC values by dividing relative distances from the detected vehicles by relative velocity values, in order to acquire the critical sections.

The surrounding environment recognizer 23 may calculate a road load at step S270. The road load may be calculated through the navigation information, the road surface condition information and the traffic information.

The surrounding environment recognizer 23 may calculate a driver risk index at step S280. The driver risk index may be calculated by adding up the trajectory load, the neighboring vehicle load and the road load.

The driving difficulty level detection unit 30 may define and quantify driving difficulty levels for various areas in advance, check in which area the current position of the ego vehicle 24 is included among the above-described areas, and then detect a driving difficulty level corresponding to the current position of the vehicle 24, at step S30.

When the current position of the ego vehicle 24 is included in an area where an accident frequently occurs or an area such as a tunnel or mountain road where driving is difficult or an actual accident occurs, the driving difficulty level may be set to a relatively high level.

As the emotion index, the driver risk index and the driving difficulty level are detected, the control unit 40 may determine whether the emotion index, the driver risk index and the driving difficulty level are included in the preset safety area, at step S40. Depending on whether the emotion index, the driver risk index and the driving difficulty level are included in the preset safety area, the control unit 40 may warn the driver or a family member, or control the vehicle driving unit 60 to drive the ego vehicle 24 to a safe area, at step S50.

In this case, when the emotion index, the driver risk index and the driving difficulty level are not included in the safety area, the vehicle driving unit 60 may drive the ego vehicle 24 to a safe area. Furthermore, the control unit 40 may warn the driver that the emotion index, the driver risk index and the driving difficulty level are not included in the safety area, or transmit a warning to a preset phone number, for example, the phone number of a friend of the driver or passenger.

When the emotion index is not included in the preset safety area after the voice index, the vision index and the behavior index have been applied to the learning-based emotion map, the control unit 40 may control the emotional state control unit 50 to control the emotional state of the driver or passenger, such that the emotional state of the driver or passenger settles down.

As such, the safe driving support apparatus and method in accordance with the embodiments of the present invention can determine the safety of the ego vehicle in operation by considering the emotion index, the driver risk index and the driving difficulty level, and move the ego vehicle to a safe area through the steering and braking control of the vehicle according to the determination result, thereby preventing an accident.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A safe driving support apparatus comprising:

a driver risk index detection unit configured to calculate a driver risk index based on *one or more calculated loads on a driver's attention, including* a trajectory load of an ego vehicle;

*a driving difficulty level detection unit configured to determine a driving difficulty level for a current area depending on a driving position of the ego vehicle;* a vehicle driving unit configured to control driving of the ego vehicle; and a control unit configured to control the vehicle driving unit to drive the ego vehicle to a safe area based on whether the *driving difficulty level is within a difficulty range and the* driver risk index is [outside] *within* a [preset] safety [area or not] *range*, wherein, for calculating the trajectory load, the driver risk index detection unit is configured to:

estimate a trajectory of the ego vehicle based on *any one or any combination of any two or more of* a speed, a steering angle, an acceleration rate, and a yaw rate of the ego vehicle[,]*;* estimate a trajectory of a neighboring vehicle based on a longitudinal distance [and] *or* a lateral distance between the ego vehicle and the neighboring vehicle[,]*;* estimate a trajectory distance value based on difference between the trajectory of the ego vehicle and the trajectory of the neighboring vehicle[,]*;* and determine the trajectory load based on whether the trajectory distance value [is smaller than] *meets* a threshold [or not], *and* wherein the control unit is configured to determine that the driver risk index is [outside] *within* the [preset] safety [area] *range* based on the trajectory load.

2. The safe driving support apparatus of claim 1, further comprising:

an emotion index detection unit configured to detect an emotion index of a driver [or passenger], using [one or more] *at least one* of vision, voice [and], *or* behavior of the driver [or passenger],

[wherein the emotion index detection unit comprises:

a first emotion recognizer configured to detect a characteristic value of a voice signal of the driver or the passenger, and detect a voice index according to the detected characteristic value;

a second emotion recognizer configured to take an image of the driver or the passenger, and detect a vision index of the driver or the passenger by analyzing the taken image;

a third emotion recognizer configured to sense a position of an accelerator or brake, and detect a behavior index according to a start pattern of the accelerator or brake and a motion of the passenger; and an emotion index calculator configured to calculate the emotion index using the voice index, the vision index and the behavior index,]

wherein the control unit is configured to further determine [that] *whether* the emotion index is [outside the preset safety area or not] *within a stable range*.

3. The safe driving support apparatus of claim [2] *18, wherein the emotion index detection unit comprises:*

*a first emotion recognizer configured to detect a characteristic value of a voice signal of the driver, and detect a voice index according to the detected characteristic value,* wherein the first emotion recognizer comprises:

a voice signal sensing unit configured to recognize the voice signal of the driver [or the passenger]; and a voice index detection unit configured to detect the characteristic value of the voice signal detected by the voice signal sensing unit, and detect the voice index corresponding to the detected characteristic value.

4. The safe driving support apparatus of claim [2] *18, wherein the emotion index detection unit comprises:*

*a second emotion recognizer configured to take an image of the driver, and detect a vision index of the driver by analyzing the taken image,* wherein the second emotion recognizer comprises:

a driver face filming unit configured to film the eyes or face of the driver; *and*

[a passenger face filming unit configured to film the eyes or face of the passenger; and]

a vision index detection unit configured to detect the eyes and face of the driver in an image taken by the driver face filming unit, [detect the eyes and face of the passenger in an image taken by the passenger face filming unit,] and detect the vision index according to eye movement or facial expression of the driver [or the passenger].

5. The safe driving support apparatus of claim [2] *18, wherein the emotion index detection unit comprises:*

*a third emotion recognizer configured to sense a position of an accelerator or brake, and detect a behavior index according to a start pattern of the accelerator or brake,* wherein the third emotion recognizer comprises:

a start pattern sensing unit configured to sense the start pattern of the accelerator or the brake; *and*

[a passenger motion index detection unit configured to detect a passenger motion index using one or more of an arm motion size and motion radius of the passenger and a motion frequency of the passenger; and]

a behavior index detection unit configured to detect the behavior index of the driver [or the passenger], using a start index corresponding to the sensed start pattern of the accelerator or the brake [or the passenger motion index detected by the passenger motion index detection unit].

6. The safe driving support apparatus of claim [2] *18, wherein the emotion index detection unit* further [comprising] *comprises* an emotional state control unit configured to control the emotional states of the driver [and the passenger] to settle down *when the emotion index is in a risk range*.

7. The safe driving support apparatus of claim 6, wherein the control unit applies the voice index, the vision index, and the behavior index to a learning-based emotion map, and [controls the emotional state control unit when] *determines whether* the emotion index is not included in the [preset safety area] *risk range based on the emotion map*.

[8. The safe driving support apparatus of claim 7, wherein the learning-based emotion map divides the emotional state of the driver into the safety area and a risk area, depending on the voice index, the vision index and the behavior index.]

9. [The] *A safe driving support apparatus comprising:*

*a driver risk index detection unit configured to calculate a driver risk index based on a trajectory load of an ego vehicle;*

*a vehicle driving unit configured to control driving of the ego vehicle; and*

*a control unit configured to warn a driver based on whether the driver risk index is within a safety range,*

*wherein, for calculating the trajectory load, the driver risk index detection unit is configured to:*

*estimate a trajectory of the ego vehicle based on any one or any combination of any two or more of a speed, a steering angle, an acceleration rate, and a yaw rate of the ego vehicle,*

*estimate a trajectory of a neighboring vehicle based on a longitudinal distance or a lateral distance between the ego vehicle and the neighboring vehicle,*

*estimate a trajectory distance value based on difference between the trajectory of the ego vehicle and the trajectory of the neighboring vehicle, and*

*determine the trajectory load based on whether the trajectory distance value meets a threshold, wherein the control unit is configured to determine that the driver risk index is within the safety range based on the trajectory load,*

*wherein the safe driving support apparatus further comprises:*

*an emotion index detection unit configured to detect an emotion index of a driver, using at least one of vision, voice, or behavior of the driver, wherein the control unit is configured to further determine whether the emotion index is within a stable range,*

*wherein the* safe driving support apparatus [of claim 2,] further [comprising] *comprises*:

a driving difficulty level detection unit configured to detect a driving difficult level depending on a driving position of the ego vehicle, wherein the driving difficulty level detection unit defines and quantifies driving difficulty levels for various areas, and detects the driving difficulty level according to the current position of the ego vehicle, *and* wherein the control unit is configured to further determine [that] *whether* the driving difficulty level is [outside] *within* the [preset] safety [area or not] *range*.

10. The safe driving support apparatus of claim 9, wherein when the emotion index *is not within the stable range*, *and* the driver risk index and the driving difficulty level are not [included] *within* in the safety [area] *range*, the control unit controls the vehicle driving unit to drive the ego vehicle to a safe area.

11. A safe driving support method comprising:

calculating, by a driver risk index detection unit, a driver risk index based on *one or more calculated loads on a driver's attention, including* a trajectory load of an ego vehicle;

*determining, by a driving difficulty level detection unit, a driving difficulty level for a current area depending on a driving position of the ego vehicle;* and determining, by a control unit, whether the driver risk index is [outside] *within* a [preset] safety [area or not] *range and whether the driving difficulty level is within a difficulty range*, and [controlling a vehicle driving unit to drive the ego vehicle to a safe area] *warning a driver* depending on *a result of the determination of whether the determined driving difficulty level is within*

*the difficulty range and a result of* the determination [result] *of whether the driver risk index is within the safety range*, wherein, for calculating the trajectory load, the driver risk index detection unit performs[;]*:* estimating a trajectory of the ego vehicle based on *any one or any combination of any two or more of* a speed, a steering angle, an acceleration rate, and a yaw rate of the ego vehicle[,]*;* estimating a trajectory of a neighboring vehicle based on a longitudinal distance [and] *or* a lateral distance between the ego vehicle and the neighboring vehicle[,]*;* estimating a trajectory distance value based on difference between the trajectory of the ego vehicle and the trajectory of the neighboring vehicle[,]*;* and determining the trajectory load based on whether the trajectory distance value [is smaller than] *meets* a threshold [or not], *and* wherein the control unit is configured to determine that the driver risk index is [outside] *within* the [preset] safety [area] *range* based on the trajectory load.

12. The safe driving support method of claim 11, further comprising:

detecting, by an emotion index detection unit, an emotion index of a driver [or passenger], using [one or more] *at least one* of vision, voice [and], *or* behavior of the driver [or the passenger;

wherein the detecting of the emotion index comprises detecting a characteristic value of a voice signal of the driver or passenger, detecting a voice index according to the detected characteristic value, taking an image of the driver or passenger, detecting a vision index of the driver or passenger by analyzing the taken image, sensing the position of an accelerator or brake, detecting a behavior index according to a start pattern of the accelerator or brake or a motion of the passenger, and calculating the emotion index using the voice index, the vision index and the behavior index], wherein the control unit determines whether the emotion index is [outside the preset safety area or not] *within a stable range*.

13. The safe driving support method of claim 12, wherein the control unit controls an emotional state control unit to control the emotional states of the driver [and the passenger] to settle down, depending on whether the emotion index is [included in] *within* the [preset safety area] *stable range*.

14. The safe driving support method of claim 12, [further comprising:

detecting, by a driving difficulty level detection unit, a driving difficulty level depending on a driving position of the ego vehicle, wherein the detecting of the driving difficulty level comprises defining and quantifying driving difficulty levels for various areas, and detecting the driving difficulty level according to the current position of the ego vehicle]

*wherein the calculating of the driver risk index is performed in real-time, and*

*wherein the determining of the driving difficulty level comprises determining the driving difficulty level from among driving difficulty levels that are predetermined for various areas before the real-time*.

15. The safe driving support method of claim 14, wherein the *control unit further performs a* controlling [of the] *a* vehicle driving unit to drive the ego vehicle to [the] *a* safe area [comprises] *depending on a result of the determination whether the driving difficulty level is within the difficulty range and a result of the determination of whether the driver risk index is within the safety range, and*

*wherein the determining of whether the emotion index is within the stable range includes* applying the voice index, the vision index, and the behavior index to a learning-based emotion map, and determining whether the emotion index is not included in [the preset safety area] *a risk range based on the emotion map*.

[16. The safe driving support method of claim 15, wherein the learning-based emotion map divides the emotional states of the driver into the safety area and a risk area, depending on the voice index, the vision index and the behavior index.]

*17. A safe driving support apparatus comprising:*

*a driver risk index detection unit configured to calculate a driver risk index in real-time based on one or more calculated loads on a driver's attention, including a trajectory load of an ego vehicle;*

*a driving difficulty level detection unit configured to determine a driving difficulty level, from among respective driving difficulty levels predetermined for various areas, depending on a driving position of the ego vehicle;*

*a vehicle driving unit configured to control driving of the ego vehicle; and*

*a control unit configured to warn a driver based on the driving difficulty level and whether the driver risk index is within a safety range,*

*wherein, for calculating the trajectory load, the driver risk index detection unit is configured to:*

*estimate a trajectory of the ego vehicle based on any one or any combination of any two or more of a speed, a steering angle, an acceleration rate, and a yaw rate of the ego vehicle;*

*estimate a trajectory of a neighboring vehicle based on a longitudinal distance or a lateral distance between the ego vehicle and the neighboring vehicle;*

*estimate a trajectory distance value based on difference between the trajectory of the ego vehicle and the trajectory of the neighboring vehicle; and*

*determine the trajectory load based on whether the trajectory distance value meets a threshold, and*

*wherein the control unit is configured to determine that the driver risk index is within the safety range based on the trajectory load.*

*18. The safe driving support apparatus of claim 17, further comprising:*

*an emotion index detection unit configured to detect an emotion index of a driver, using at least one of vision, voice, or behavior of the driver,*

*wherein the control unit is configured to further determine whether the emotion index is within a stable range.*

*19. The safe driving support apparatus of claim 17, wherein the determination of the trajectory load is based on whether the trajectory distance value is greater than the threshold.*

*20. The safe driving support apparatus of claim 17, wherein the driver risk index is an index value on a driver risk axis of a safety area, where the threshold value is a value that corresponds to a delineation between the safety area and portions of a space outside of the safety area, the safety area being within the space defined by a driver emotion axis, the driver risk axis, and a driver difficulty axis, with the driving difficulty level being an index value on the driver difficulty axis.*

*21. The safe driving support apparatus of claim 18, wherein the control unit is configured to further determine whether respective emotion indices are within respective stable ranges of the at least one of the vision, the voice, or the behavior.*

*22. The safe driving support apparatus of claim 18, wherein the control unit is further configured to control the vehicle driving unit to drive the ego vehicle to a safe area based on whether the driver risk index is within the safety range.*

*23. The safe driving support apparatus of claim 17, wherein the control unit is configured to warn the driver based on whether the driving difficulty level is within a difficulty range and the driver risk index is within the safety range.*

*24. The safe driving support apparatus of claim 17, wherein the control unit is further configured to control the vehicle driving unit to drive the ego vehicle to a safe area based on whether the driver risk index is within the safety range and based on whether the driving difficulty level is within a difficulty range.*

*25. The safe driving support apparatus of claim 17, wherein, for predetermining the driving difficulty levels, the driving difficulty level detection unit defines and quantifies the driving difficulty levels for the various areas before the real-time.*

*26. The safe driving support apparatus of claim 20, further comprising an emotion index detection unit configured to detect an emotion index, along the driver emotion axis, of a driver using at least one of vision, voice, or behavior of the driver,*

*wherein the control unit is further configured to control the vehicle driving unit to selectively, based the driver risk index, the driving difficulty level, and the emotion index, drive the ego vehicle to a safe area.*

*27. The safe driving support apparatus of claim 21, wherein the control unit is configured to warn the driver based on whether the driving difficulty level is within a difficulty range, the driver risk index is within the safety range, and dependent on a result of the determination of whether the respective emotion indices are within respective stable ranges.*

*28. The safe driving support apparatus of claim 1,*

*wherein the driver risk index detection unit is configured to calculate the driver risk index in real-time, and*

*wherein, for the determination of the driving difficulty level, the driving difficulty level detection unit is configured to determine the driving difficulty level from among driving difficulty levels that are predetermined for various areas before the real-time.*

*29. The safe driving support apparatus of claim 28, wherein, for predetermining the driving difficulty levels, the driving difficulty level detection unit is further configured to define and quantify the driving difficulty levels for the various areas before the real-time.*

*30. The safe driving support method of claim 14, wherein the determining of the driving difficulty level further comprises defining and quantifying the driving difficulty levels for the various areas before the real-time.*

* * * * *